Patented Apr. 18, 1933

1,904,791

UNITED STATES PATENT OFFICE

HANS KANTOROWICZ, OF BERLIN-WILMERSDORF, AND ARNOLD KÖHLER, OF SPANDAU NEAR BERLIN, GERMANY, ASSIGNORS TO FETTSAURE- UND GLYCERIN-FABRIK G. M. B. H., OF MANNHEIM, GERMANY

PROCESS FOR MAKING SULPHONATED PRODUCTS

No Drawing. Application filed April 9, 1932, Serial No. 604,350, and in Germany April 14, 1931.

The sulphonation of the ordinary fatty acids of animal or vegetable origin, which contain considerable quantities of solid fatty acids, leads under the conditions usually employed in the case of neutral oils, more particularly at the temperatures commonly used in the sulphonation of castor oil, to products which do not possess the requisite bright colour and the important solvent properties possessed by turkey red oil and highly sulphonated neutral oils. Since the production from fat bodies of sulphonated products which are free from, or poor in, neutral fat is a matter of technical importance, attempts have consequently been made to obtain such products by either starting from ricinoleic acid and therefore from a hydroxy-acid, or, when using ordinary fatty acids or oleins, sulphonating these in solution, e. g. dissolved in acetic anhydride or in neutral oils, which technically is a somewhat involved process; or, alternatively, to use a very large excess of sulphuric acid as solvent at low temperatures lying below $-15°$ C., which low cooling renders prosecution of the technical process more difficult, and to remove these quantities of acid, which are very large from a technical point of view, by interposing a diaphragm purification in the course of the process. All these complications and difficulties which arise in the sulphonation were caused by the fact that the usual semi-drying or non-drying normal commercial fatty acids begin to solidify at temperatures below $+15°$ C., which technically is detrimental.

It has now been found that commercial oleic acids and oleins can be successfully sulphonated without the said aids if the said commercial oleic acids and oleins are previously, for instance by cooling down to $-5°$ C. to $+10°$ C., freed to a very large extent from solid constituents, the said commercial oleic acids and oleins rendered thinly liquid in this way being sulphonated at sufficiently low temperatures by means of sulphuric acid or other known sulphonating agents, and then freed from sulphonating agents which have not reacted by washing operations. In this way sulphonated commercial oleic acids and oleins are obtained which dissolve to form clear solutions, are brightly coloured, have only a mild odour, and which as such, or in the form of their salts or derivatives, are satisfactorily soluble in soft, neutral, hard or acid, cold or hot water, always with notable formation of a stable froth, as well as with high stability towards lime and boiling, to form cleansing, emulsifying, dispersion, moistening, levelling and carbonizing, agents and which also can be used as a saponin substitute for froth fire extinguishing agents, for disinfecting purposes, combating insects, and also for bucking, fulling, sizing and dressing and also in the manufacture of artificial silk, in which case they may also act at the same time as greasing agents.

The sulphonated olein with cold test, which is made at low temperature, e. g. above $0°$ C., with cooled sulphonating agents, contains variable quantities of sulphonic acids which are not capable of being split up with mineral acid in the usual way; thus, for example, 50 parts of non-splittable sulphonic acid to 100 parts of splittable sulphonic acid. The methods of employment set forth in the specification depend partly on this formation of resistant sulphonic acids. The sulphonated olein with cold test combines certain properties for use in the textile art and this combination distinguishes cold-stable oleins from other sulphonated fatty substances. Sulphonated cold-stable olein is, as was to be expected in view of the low temperature at which the original solidification commences, poor in saturated fatty acids, i. e. poor in difficultly soluble soap formers. It contains no readily oxidizable neutral oils, such as for example, vegetable oils, and no resinifying fatty acids, such as for example, castor oil fatty acids, no deeply coloured polymerized bodies, and no large quantities of hydroxy acids, estolides or lactones formed by the sulphonating agent. The product used according to the specification, since it is made without the use of a solvent, is also not obtained by means of chloracetyl chloride sulphonic acid. On the other hand the sulphonated cold-stable olein contains variable quantities of non-splittable sulphonic acids, so that it can be used both as 1. A brightly coloured, emulsifying, thinly liquid olein with the typical usual characterizing values of the non-emulsifying oleins, e. g. with an acid value of 196, a saponification value of 197, and an iodine value of 86, and so forth, as well as 2. A water soluble brightly coloured free or neutralized acid which is stable towards boiling and lime.

This combination of all the aforesaid properties is numerically impossible when using castor oil or vegetable fatty acids or olein which has not been freed to a large extent from solid fatty acids prior to the sulphonation and is sulphonated with formation of estolides or with local overheating.

The oil-soluble products obtainable by this sulphonation of cold-stable oleins or commercial oleic acids with sulphuric acid and similar known sulphonating agents, preferably at temperatures above 0° C., and for example neutralized in the sulphonic radical, may be added to spinning oils or spinning oleins and in this way highly concentrated homogeneous oils are obtained which are pre-eminently adapted for the spinning and devilling of wool owing to their stability towards oxygen as shown by the Mackey test:—

| | Minutes | | | | |
|---|---|---|---|---|---|
| Mackey test C.° after | 75 | 90 | 95 | 120 | 150 |
| Spinning oil without iron | 99 | 101 | 101 | 105 | 200 |
| Spinning oil with iron | 106 | 122 | 200 | | |
| Spinning oil without iron and with sulphonated cold-stable olein | 100 | 102 | 104 | 120 | 105 |
| Spinning oil with iron and with sulphonated cold-stable olein | 116 | 117 | 115 | 105 | 101 |

They do not contain any negative catalysts therefore which are alien in kind nor dyestuff components of the nature of naphthols.

Whereas an iron-containing olein showed a Mackey test of 200° C. after 95 minutes, therefore, the same iron-containing olein after addition of sulphonated cold-stable olein possessed a very favourable Mackey test of only 105° C. after 120 minutes. If instead of the sulphonated cold-stable olein the same quantity of turkey red oil is added in the known manner to the same iron-containing olein then an unfavourable Mackey test of 200° C. was obtained after only 75 minutes. This unfavourable result, which was obtained with a sulphonated vegetable oil, is to be attributed to the strongly unsaturated nature of the said oil.

For example, 500 kg. of an olein which is a clear liquid at $+3°$ C. are cooled down to a temperature of $+3°$ C. and are gradually combined whilst stirring and cooling with 200-500 kg. of a concentrated sulphuric acid which had been cooled down to $-5°$ C., the combination being effected by a known method of mixing at a working temperature between 0° C. and about $+15°$ C. After the usual washing process, e. g. with a solution of Glauber salt, a sulphonation product is obtained having the said properties which can be wholly or partially neutralized in known manner, or can be esterified with aliphatic or hydro-aromatic alcohols, or can be mixed with other products, such as for example, solid soda.

In the same way commercial oleic acid which has been extensively freed from solid constituents by cooling can be sulphonated under equivalent conditions with chlorsulphonic acid to form a product which, besides outstanding frothing capabilities, in neutral or acid aqueous solution possesses high stability towards lime and boiling and a satisfactory moistening, emulsifying and cleansing action.

For example, 1 part of sulphonated olein, prepared as described above, and 3 parts of soap are mixed together to form a 0.4% soap solution and may be used for fulling woolen wares in soft or hard water with avoidance of greasy lime soaps.

Again, as an example, 100 g. of sulphonated commercial oleic acid obtained as described above are dissolved in 30 litres of a sulphuric acid having a concentration of 2° Bé. and used for acid fulling in the manufacture of felt in order to produce a satisfactory feel and an article which is without smell.

As a further example again, a dye bath is made containing in 1 litre 1-3 g. of oleins sulphonated as described above. The addition substantially raises the equalizing capabilities during the dyeing operation.

What we claim is:—

1. A process for making sulphonated commercial oleic acids or oleins consisting in sulphonating commercial oleic acids or oleins which have been destearinized with a sulphonating agent at low temperature.

2. A process for making sulphonated commercial oleic acids or oleins consisting in sulphonating commercial oleic acids or oleins which have been destearinized with sulphuric acid at a low temperature.

3. A process for making sulphonated commercial oleic acids or oleins, consisting in sulphonating commercial oleic acids or oleins with a sulphonating agent at a low temperature, said oleins having been previously freed to a very large extent of solid fatty acid.

4. A process for making sulphonated commercial oleic acids or oleins, consisting in sulphonating commercial oleic acids or oleins with sulphuric acid at a low temperature, said oleins having been previously freed to a very large extent of solid fatty acid.

In testimony whereof we have signed our names to this specification.

HANS KANTOROWICZ.
ARNOLD KÖHLER.